(12) United States Patent
Russell

(10) Patent No.: US 10,522,051 B2
(45) Date of Patent: Dec. 31, 2019

(54) FIRE SAFETY SIMULATOR

(71) Applicant: Warner C. Russell, Eagle River, WI (US)

(72) Inventor: Warner C. Russell, Eagle River, WI (US)

(*) Notice: Subject to any disclaimer, the term of this patent is extended or adjusted under 35 U.S.C. 154(b) by 0 days.

(21) Appl. No.: 15/998,234

(22) Filed: Sep. 15, 2017

(65) Prior Publication Data

US 2019/0035302 A1    Jan. 31, 2019

Related U.S. Application Data

(63) Continuation of application No. 13/986,209, filed on Apr. 12, 2013, now abandoned.

(51) Int. Cl.
*G09B 19/00*    (2006.01)

(52) U.S. Cl.
CPC .................... *G09B 19/00* (2013.01)

(58) Field of Classification Search
CPC .......... F41A 33/00; F41A 33/02; F41A 33/04; F41A 33/06; F41G 3/26; F41G 3/2655; G09B 9/00
See application file for complete search history.

(56) References Cited

U.S. PATENT DOCUMENTS

| | | | | |
|---|---|---|---|---|
| 4,482,325 A | * | 11/1984 | Reimann | F41J 5/00 273/317 |
| 5,320,358 A | * | 6/1994 | Jones | A63B 63/00 273/371 |
| 6,746,334 B1 | | 6/2004 | Barney | |
| 7,748,983 B2 | * | 7/2010 | Blackburn | A62C 99/0081 434/226 |
| 2005/0233289 A1 | | 10/2005 | Hoglund | |

* cited by examiner

*Primary Examiner* — Timothy A Musselman
(74) *Attorney, Agent, or Firm* — McDonnell Boehnen Hulbert & Berghoff LLP

(57) ABSTRACT

The system has in one embodiment a representative structure having a predefined area having a plurality of changeable targets, each of the changeable targets having at least first and second positions. At least one aiming device has an activator for effecting a change of a selected changeable target between the first and second positions thereof when the activator is triggered while the aiming device is aimed at the selected changeable target. At least one signal device is activated by changes from respective first positions to respective second positions of at least some of the changeable targets.

15 Claims, 5 Drawing Sheets

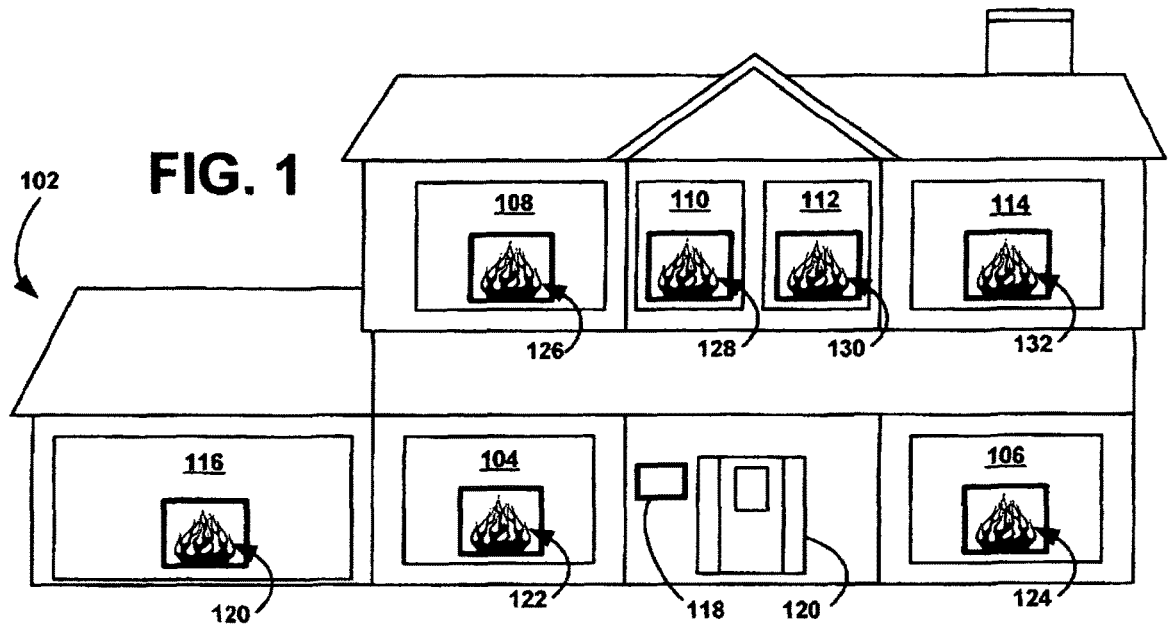
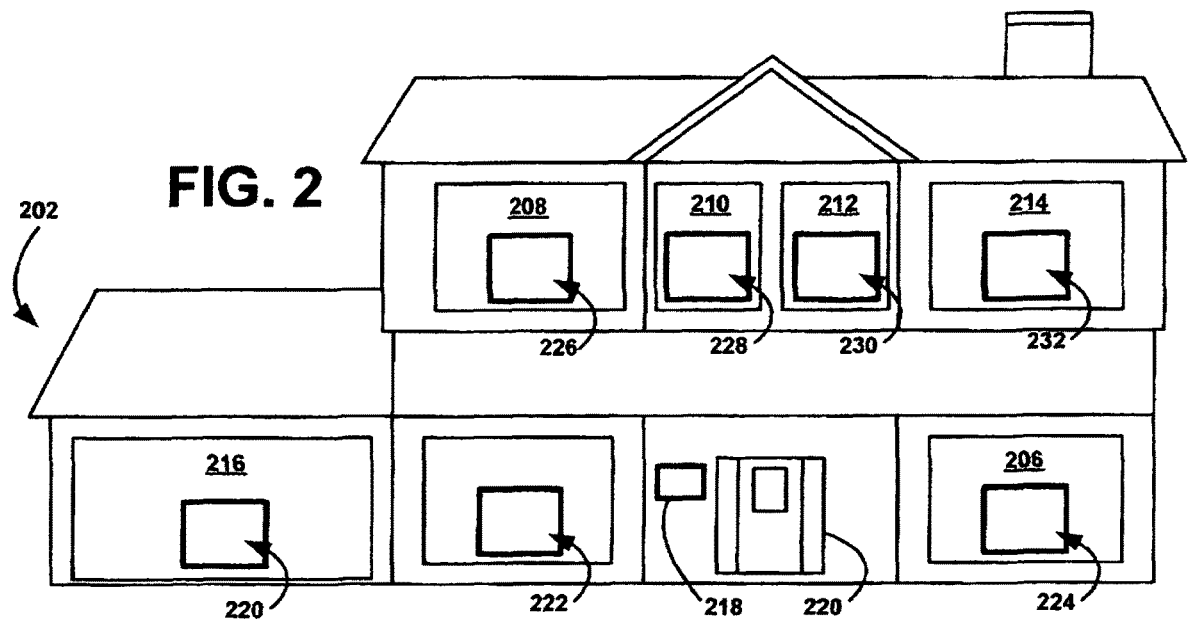

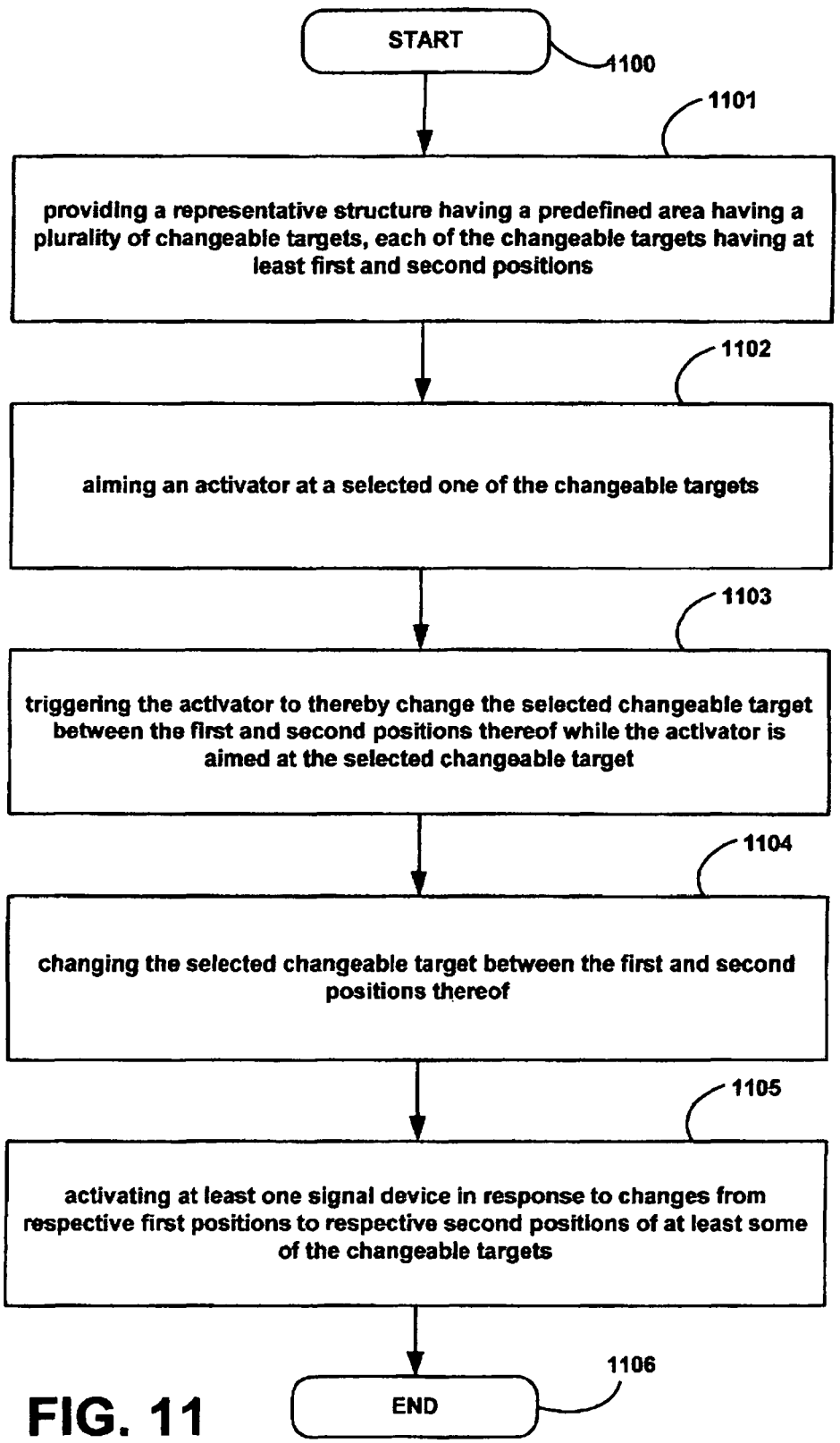

FIRE SAFETY SIMULATOR

CROSS REFERENCE TO RELATED APPLICATION

The present application is a continuation of application Ser. No. 13/986,209, filed Apr. 12, 2013, which is hereby incorporated by reference.

TECHNICAL FIELD

The invention relates generally to simulators, and more particularly to a means for teaching fire safety awareness.

BACKGROUND

Most home fires can be prevented. A home may be full of fire hazards that people are not aware of. From a kitchen stove, to a romantic candle, to festive holiday lights, common household items can turn dangerous very quickly.

Fire safety may refer to precautions that are taken to prevent or reduce the likelihood of a fire that may result in death, injury, or property damage. Fire safety may also refer to alerting those in a structure to the presence of an uncontrolled fire in the event one occurs. This better enable those threatened by a fire to survive in and evacuate from affected areas, as well as to reduce the damage caused by a fire. It is important that everyone understand the nature of fire, and learn awareness on how and where fires get started.

Most U.S. fire departments have fire safety education programs. Fire prevention programs may include distribution of smoke detectors, visiting schools to review key topics with the students and implementing nationally recognized programs such as NFP As "Risk Watch" and "Learn not to burn".

Other programs or props may be purchased by fire departments or community organizations. These usually try to be entertaining to capture children's attention and relay important messages. Props include those that are mostly auditory, such as puppets and robots. The prop is visually stimulating but the safety message is only transmitted orally. Other props are more elaborate, access more senses and increase the learning factor. They mix audio messages and visual cues with hands-on interaction. Examples of these include large complex systems, such as, mobile trailer safety houses and lesser devices, such as, tabletop hazard house simulators.

All programs tend to mix messages of general injury prevention, safety, fire prevention, and escape in case of fire. In most cases the fire department representative is regarded as the expert and is expected to present information in a manner that is appropriate for each age group.

However these varieties of programs have not been especially "kid friendly". That is they do not provide a system that is entertaining enough to keep the attention of children, while still teaching children the importance and required information regarding fire safety.

Therefore, there is a need for an improved method and system for teaching fire safety awareness.

SUMMARY

One implementation of the present method and apparatus encompasses a system. This embodiment of the system may comprise: a representative structure having a predefined area having a plurality of changeable targets, each of the changeable targets having at least first and second positions; at least one aiming device having an activator for effecting a change of a selected changeable target between the first and second positions thereof when the activator is triggered while the aiming device is aimed at the selected changeable target; and at least one signal device that is activated by changes from respective first positions to respective second positions of at least some of the changeable targets.

Another implementation encompasses a method. This embodiment of the method may comprise: providing a representative structure having a predefined area having a plurality of changeable targets, each of the changeable targets having at least first and second positions; aiming an activator at a selected one of the changeable targets; triggering the activator to thereby change the selected changeable target between the first and second positions thereof while the activator is aimed at the selected changeable target; changing the selected changeable target between the first and second positions thereof; and activating at least one signal device in response to changes from respective first positions to respective second positions of at least some of the changeable targets.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

FIG. 1 depicts one embodiment of structure in the present method and system for a Fire Safety Simulator System;

FIG. 2 depicts another view of the FIG. 1 embodiment of the present method and system for a Fire Safety Simulator System;

FIG. 11 is a flow diagram depicting operation of an embodiment of the present method and system for a Fire Safety Simulator System.

DETAILED DESCRIPTION

Figure 3:
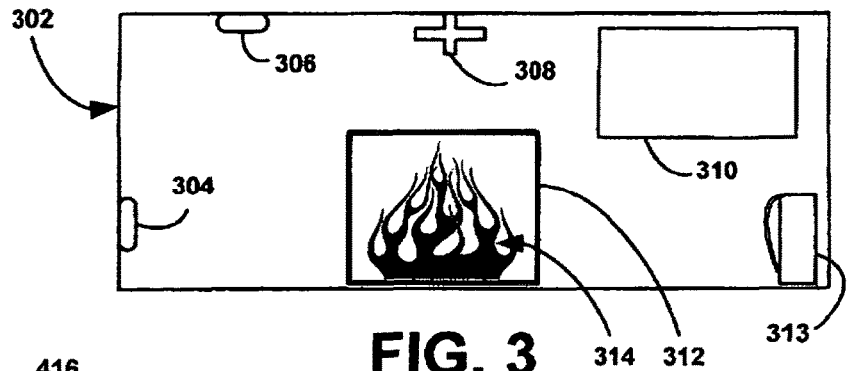
FIG. 3 depicts a further embodiment of a portion of the FIG. 1 embodiment of the present method and system for a Fire Safety Simulator System.

Fire safety may refer to precautions that are taken to prevent or reduce the likelihood of a fire that may result in death, injury, or property damage, alert those in a structure to the presence of an uncontrolled fire in the event one occurs, better enable those threatened by a fire to survive in and evacuate from affected areas, or to reduce the damage caused by a fire.

Everyone should learn as much as they can about fire safety in the home. FIG. 1 depicts one embodiment of a structure 102 of a Fire Safety Simulator System according to the present invention. The Fire Safety Simulator System allows an instructor to effectively teach Fire Safety Awareness in the home and the practical use of a Firefighter Nozzle or a real Fire Extinguisher using the P.A.S.S. (Pull the pin, Aim at the base of the fire, Squeeze the trigger, and Sweep the fire) method. It is the up-most importance to practice the E.D.I.T.H. (Exit Drill In The Home) drill for evacuating the home in the event of a fire. It is also crucial that everyone understand the nature of fire, and how and where fires get started. It is also important to practice fire safety thought-out the year.

The structure 102 may be a large water resistant free-standing image of a simulated home. Numerous other depictions of homes, commercial buildings, and even open areas, such as forests and grass lands are encompassed by the Fire Safety Simulator System. The Fire Safety Simulator System is the perfect tool to teach Fire Safety Awareness about the top fire hazards in the home. The structure 102 may have a plurality of areas or rooms, such as a kitchen 104, a living room 106, a first bedroom 108, a bath room 110, a laundry room 112, a second bedroom 114, and a garage 116. Each of the rooms 104, 106, 108, 110, 112, 114 and 116 may have depicted furniture and other items (not shown in FIG. 1) as would be typical. Furthermore, each room may show typical fire hazards to help an instructor explain different fire threats. The Fire Safety Simulator System may also include a laminated lesson plan (not shown) that includes information sheets on specific facts.

In accordance with the present embodiment depicted in FIG. 1, each of the rooms 104, 106, 108, 110, 112, 114 and 116 may have depicted a fire 122, 124, 126, 128, 130, 132 and 120, respectively. As will be explained later, the fires 122, 124, 126, 128, 130, 132 and 120 are to be extinguished. This provides a fun way for children to learn fire safety.

In accordance with the present embodiment depicted in FIG. 2, when the fires are extinguished, the fires are no longer visible in areas 222, 224, 226, 228, 230, 232 and 220 in the rooms 204, 206, 208, 210, 212, 214 and 216, respectively, of the structure 202. As will be explained below there a number of different ways to affect disappearance of the fires in the rooms in response to, for example, operation of a fire extinguisher.

In accordance with the present embodiment depicted in FIG. 2, each of the rooms 104, 106, 108, 110, 112, 114 and 116 may also be set up with proper safety requirements, such as, Smoke Detectors, Fire Extinguishers, Residential Fire Sprinklers, Carbon Monoxide Detectors and an EDITH plan poster in the kitchen.

FIG. 3 depicts in general a representative room 302 of each of the rooms 104, 106, 108, 110, 112, 114 and 116 shown in FIG. 1. The room 302 may have a smoke detector 306, a fire extinguisher 316, a fire sprinkler 308, a carbon monoxide detector 304, an area 312 depicting a fire 314, a fire extinguisher 313, and an instructive caution, warning or danger sign 310. The sign 310 may be, for example: a danger sign in the garage 116 stating, "Keep Flammable Liquids in Proper Storage Areas"; a warning sign in the bathroom 110, stating, "Dispose of Smoking Material Properly"; and caution signs in the various remaining respective rooms 104, 106, 108, 112, and 114, stating, "When Candles are in Use", "Use Fireplace Screens at all times", "Practice Fire Safety in Kitchen", "Keep Dryer Clean and Free of Lint", and "Clean Fireplace Flue Once a Year", etc. Other types of signs and other devices may be shown in the rooms 104, 106, 108, 110, 112, 114 and 116 according to embodiments of the present method and apparatus.

Figure 4:
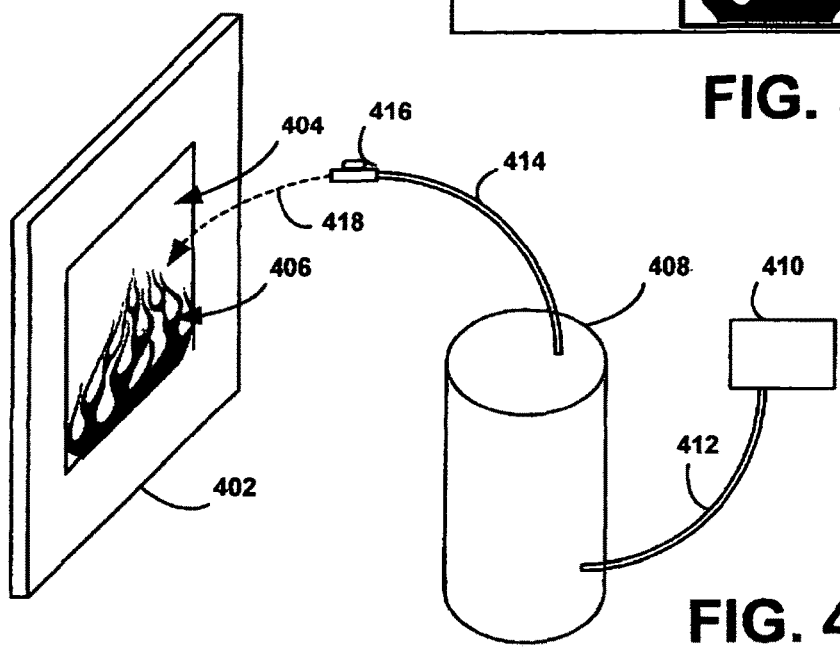
FIGS. 4 and 5 depict operation of the Fire Safety Simulator System according to one embodiment of the present method and system.
Figure 5:
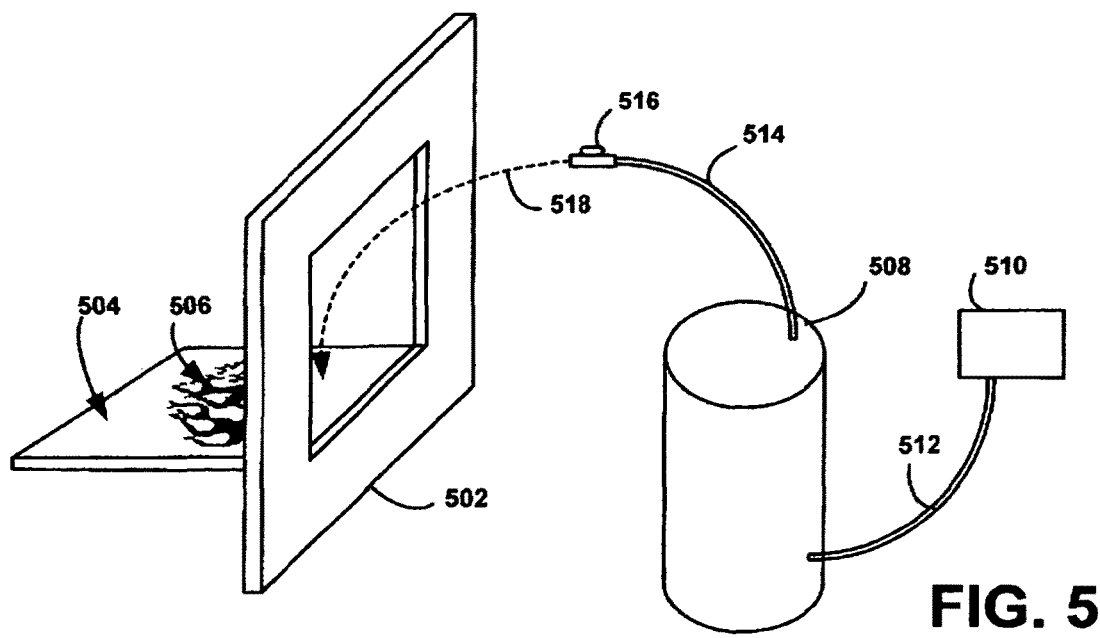

FIGS. 4 and 5 depict operation of the Fire Safety Simulator System according to one embodiment of the present method and system. A fire extinguisher 408, 508 is operatively coupled to a continuous pressurized source 410, 510 of water via, for example, a standard garden hose 412, 512. The fire extinguisher 408, 508 may have a hose 414, 514 having a valve operated nozzle 416, 516. As previously described each of the rooms in the structure may have an area 404, 504 that displays a fire 406, 506.

In the FIGS. 4 and 5 embodiments the area 404, 504 may be a door that in an initial first position is closed as depicted in FIG. 4. When the area 404, 504 is struck by a stream of water 418, 518 the door drops down into a second position, as depicted in FIG. 5, and the fire 406, 506 is no longer visible. The door in general may be referred to as a changeable target. Thus, the Fire Safety Simulator System simulates the extinguishing of a fire in a room of the structure by using a fire extinguisher.

In order to assist in the teaching of fire safety, when all of the doors 404, 504 have been moved from their first position to their second position, that is, when all of the "fires" in the rooms have been extinguished by hitting the doors 404. 504 with the water stream 418, 518, the signal device 118, 218 on the front of the structure 102, 202 near a front door 120, 220 is activated. The signal device 118, 218 may be, for example, at least one of a siren, a horn, a light, a flashing light, and a recorded message.

Figure 6:
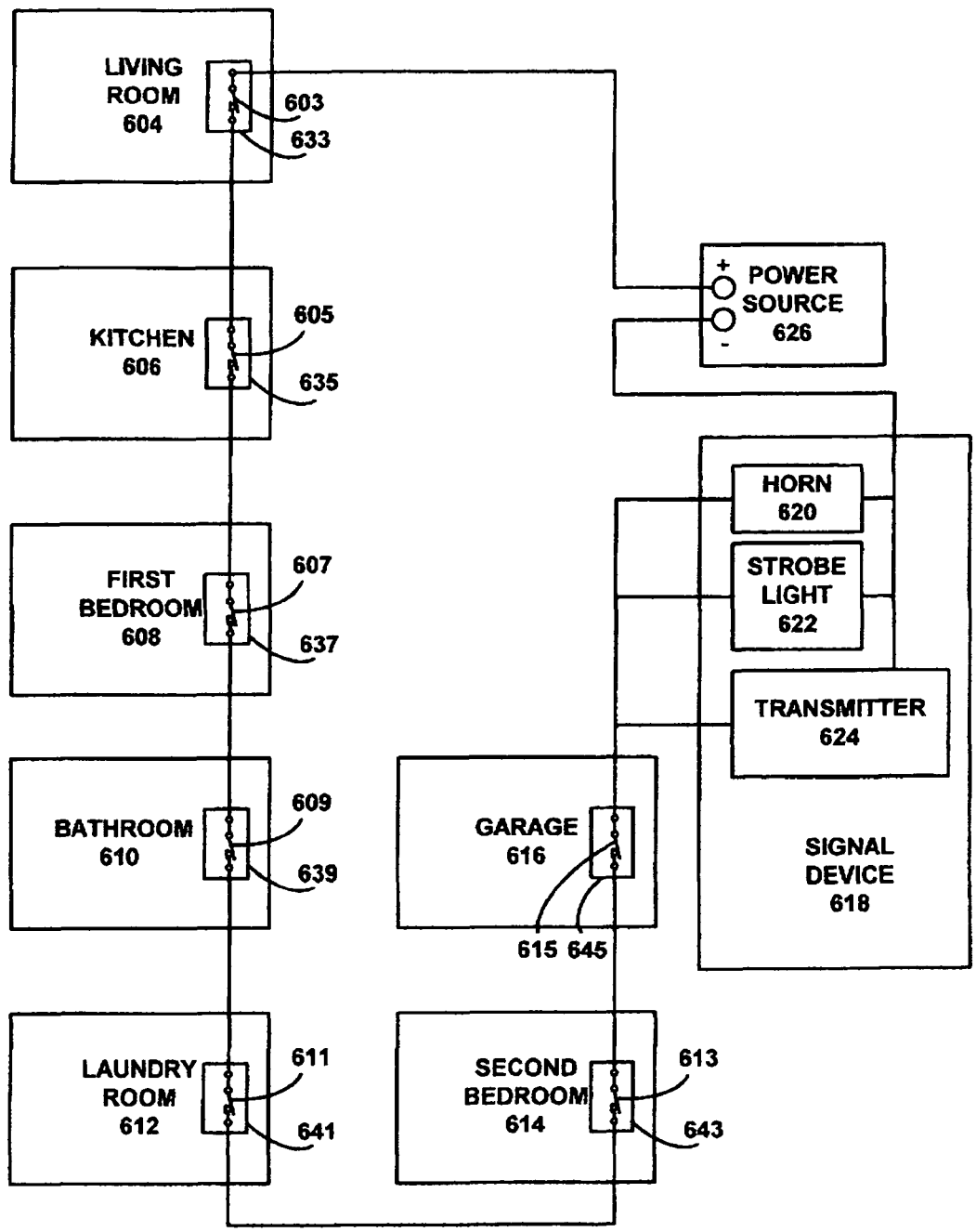
FIG. 6 depicts circuit diagram of an embodiment of the present method and system for a Fire Safety Simulator System.

FIG. 6 depicts a circuit diagram of an embodiment of the present method and system for a Fire Safety Simulator System. Each of the rooms 604, 606, 608, 610, 612, 614, 616 may have an electrical switch 603, 605, 607, 609, 611, 613, 615 operatively coupled to a respective changeable target 633, 635, 637, 639, 641, 643, 645 having at least first and second positions. Each of the changeable targets 633, 635, 637, 639, 641, 643, 645 may be a door 404, 504 depicted in FIGS. 4 and 5 wherein the first position is a closed position and the second position is an open position. An on/off switch 651 is provided to turn the entire system on and off.

When all of the switches 603, 605, 607, 609, 611, 613, 615 are closed as shown in FIG. 6, that is when each of the changeable targets 633, 635, 637, 639, 641, 643, 645 are in their second position, the power source 626 is operatively coupled to the signal device 618. The signal device 618 may have at least one of, for example, a horn 620, a strobe light 622, and/or a transmitter 624. The transmitter 624 may, for example, send a signal via a wired or wireless means to a remote receiver. Other wiring configurations may be implemented. For example, at least some of the plurality of changeable targets 633, 635, 637, 639, 641, 643, 645 may be changed between the first and second positions in a random order to activate the at least one signal device 618. Alternatively, any one of the changeable targets 633, 635, 637, 639, 641, 643, 645 may activate the at least one signal device 618.

Figure 7:
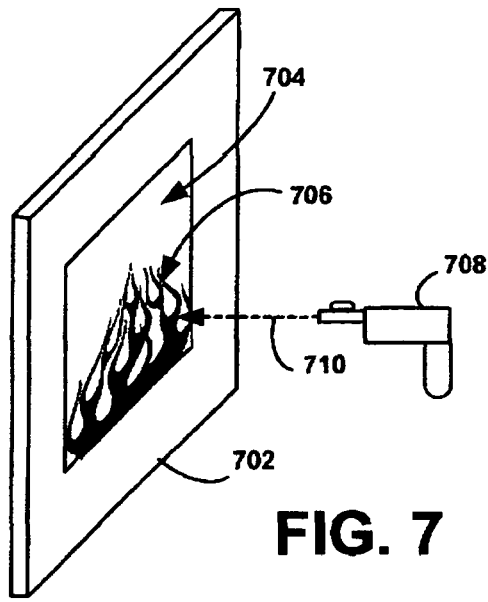
FIGS. 7 and 8 depict operation of the Fire Safety Simulator System according to an alternative embodiment of the present method and system.
Figure 8:
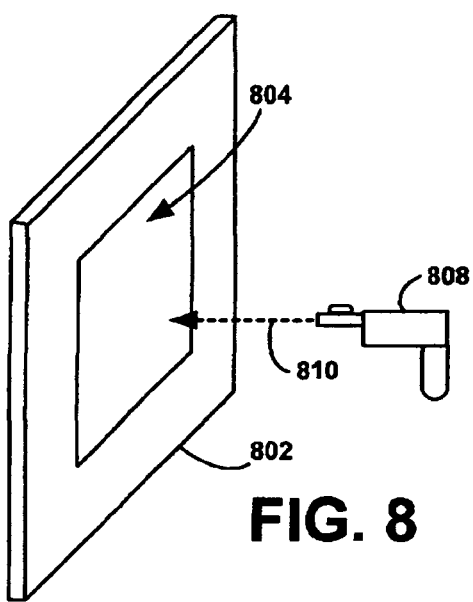

FIGS. 7 and 8 depict operation of the Fire Safety Simulator System according to an alternative embodiment of the present method and system. In this embodiment a transmitter device 708, 808 may output, for example, an infrared beam 710, 810. The changeable target 704, 804 may be a still or animated image of a fire 706, which disappears when the changeable target 704, 804 is stuck by the infrared beam 710, 810.

Figure 9:
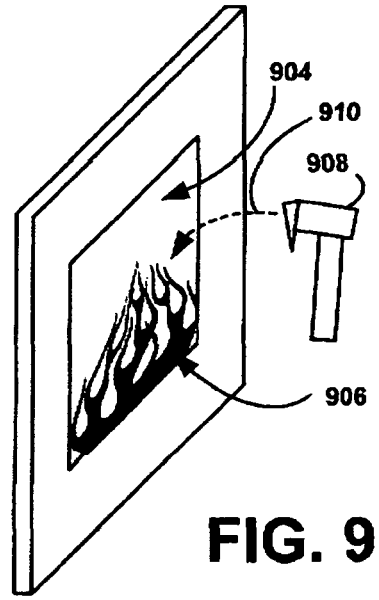
FIGS. 9 and 10 depict operation of the Fire Safety Simulator System according to yet anther embodiment of the present method and system.
Figure 10:
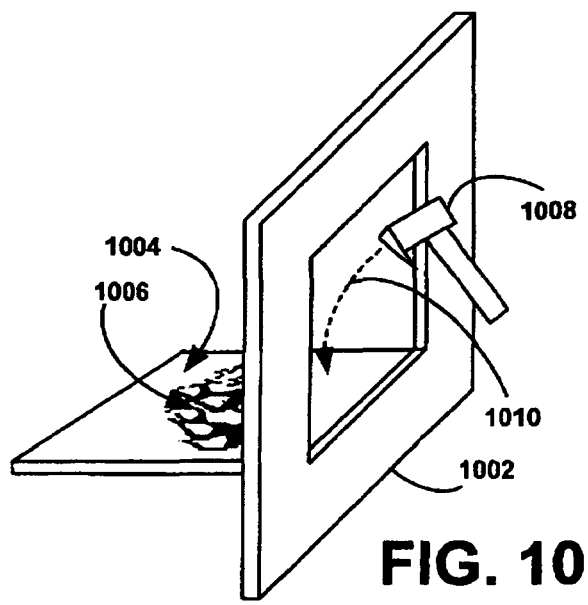

FIGS. 9 and 10 depict operation of the Fire Safety Simulator System according to yet another embodiment of the present method and system. In this embodiment an axe 908, 1008 is movable along a path 910, 1010 in order to move the changeable target 904, 1004 from a first position depicted in FIG. 9 to a second position depicted in FIG. 10. Thus in the first position the fire 906 is visible, and in the second position the fire 1006 is no longer visible. The axe 908, 1008 may be made of foam, for example. The axe may be used with the above described structure of the Fire Safety Simulator for indoor use when water is not an option.

FIG. 11 is a flow diagram depicting operation of an embodiment of the present method and system for a Fire Safety Simulator System. The present method starts 1100 and in a first step 1101 provides a representative structure having a predefined area having a plurality of changeable targets, each of the changeable targets having at least first and second positions. In a second step 1102 an activator is aimed at a selected one of the changeable targets. In a third step 1103 the activator is triggered to thereby change the selected changeable target between the first and second positions thereof while the activator is aimed at the selected changeable target. In a forth step 1104 the selected changeable target is changed between the first and second positions thereof. In a fifth step 1104 at least one signal device is activated in response to changes from respective first positions to respective second positions of at least some of the changeable targets. This then ends 1106 the method.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A fire safety simulator, comprising:
   a structure having a predefined area and a plurality of changeable targets, wherein the predefined area has a plurality of subareas, wherein each subarea of the plurality of subareas includes a respective changeable target of the plurality of changeable targets, wherein each changeable target of the plurality of changeable targets has at least first and second positions, and wherein, for each changeable target of the plurality of changeable targets, the first position represents a fire and the second position represents an extinguished fire;
   a fire extinguisher configured to emit a stream of liquid, wherein when the stream of liquid strikes the respective changeable target, the respective changeable target changes from the first position to the second position; and
   a signal device that is activated when each changeable target of the plurality of changeable targets changes from a respective first position to a respective second position.

2. The fire safety simulator according to claim 1, wherein each of changeable target of the plurality of changeable targets is a door type structure in which the first position is a closed position and the second position is an open position.

3. The fire safety simulator according to claim 1, wherein the predefined area is a depiction of a building, wherein each subarea of the plurality of subareas depicts a respective room in the building, and wherein the respective changeable target in the first position represents the fire in the respective room in the building, and in the second position represents the extinguished fire in the respective room.

4. The fire safety simulator according to claim 1, wherein the fire extinguisher is coupled to a continuous source of the liquid.

5. The fire safety simulator according to claim 1, wherein each subarea of the plurality of subareas has pictured at least one of a hazard sign having a respective predetermined message, a sprinkler, a smoke detector, and a carbon monoxide detector.

6. The fire safety simulator according to claim 1, wherein the signal device comprises at least one of a siren, a horn, a light, a flashing light, and a recorded message.

7. The fire safety simulator according to claim 1, wherein each changeable target of the plurality of changeable targets displays at least one of a stationary depiction of the fire and a video depiction of the fire, and displays the extinguished fire.

8. The fire safety simulator according to claim 1, wherein each changeable target of the plurality of changeable targets is a visual depiction, and wherein the first position visually depicts the fire and the second position visually depicts the extinguished fire.

9. The fire safety simulator according to claim 1, wherein the structure is at least one of a building, a plurality of buildings, and an outdoor area.

10. A method of simulating extinguishing of fire in a structure having a predefined area and a plurality of changeable targets, wherein the predefined area has a plurality of subareas, wherein each subarea of the plurality of subareas includes a respective changeable target of the plurality of changeable targets, wherein each changeable target of the plurality of changeable targets has at least first and second positions, and wherein, for each changeable target of the plurality of changeable targets, the first position represents a fire and the second position represents an extinguished fire, the method comprising;
    (a) aiming a fire extinguisher at a selected changeable target of the plurality of changeable targets;
    (b) triggering the fire extinguisher to emit a stream of liquid that strikes the selected changeable target of the plurality of changeable targets to thereby change the selected changeable target from the first position to second position while the fire extinguisher is aimed at the selected changeable target; and
    (c) repeating steps (a) and (b) such that each changeable target of the plurality of changeable targets changes from a respective first position to a respective second position to thereby activate a signal device in response to the changes from respective first positions to respective second positions of the changeable targets.

11. The method according to claim 10, wherein each changeable target of the plurality of changeable targets is a door type structure in which the first position is a closed position and the second position is an open position.

12. The method according to claim 10, wherein the predefined area is a depiction of a building, wherein each subarea of the plurality of subareas depicts a respective room in the building, and wherein the respective changeable target in the first position represents the fire in the respective room in the building, and in the second position represents the extinguished fire in the respective room.

13. A fire safety simulator, comprising:
    a structure having a predefined area and a plurality of changeable targets, wherein the predefined area has a plurality of subareas, wherein each subarea of the plurality of subareas includes a respective changeable target of the plurality of changeable targets, wherein each changeable target of the plurality of changeable targets has at least first and second positions, and wherein, for each changeable target of the plurality of changeable targets, the first position represents a fire and the second position represents an extinguished fire; and a fire extinguisher configured to emit a stream of liquid, wherein when the stream of liquid strikes the respective changeable target, the respective changeable target changes from the first position to the second position.

14. The fire safety simulator according to claim 13, wherein each changeable target of the plurality of changeable targets is a door type structure in which the first position is a closed position and the second position is an open position.

15. The fire safety simulator according to claim 13, wherein the predefined area is a depiction of a building, wherein each subarea of the plurality of subareas depicts a respective room in the building, and wherein the respective changeable target in the first position represents the fire in the respective room in the building, and in the second position represents the extinguished fire in the respective room.

\* \* \* \* \*